United States Patent [19]

Sakai et al.

[11] Patent Number: 4,928,550
[45] Date of Patent: May 29, 1990

[54] SLIDING BEARING AND CRANKSHAFT USED FOR CRANKSHAFT-CONNECTING ROD ASSEMBLY

[75] Inventors: Takeshi Sakai; Tsuneo Ito, both of Chiba, Japan

[73] Assignee: NDC Company, Ltd., Chiba, Japan

[21] Appl. No.: 254,638

[22] Filed: Oct. 7, 1988

[51] Int. Cl.$^5$ ............................................. F16C 3/04
[52] U.S. Cl. ......................................... 74/595; 74/597
[58] Field of Search ................. 74/605, 604, 603, 595, 74/596, 579 R, 579 E, 579 F, 580; 384/288, 289, 291

[56] References Cited

U.S. PATENT DOCUMENTS

| | | | |
|---|---|---|---|
| 2,004,254 | 6/1935 | Taub | 384/288 |
| 2,131,170 | 9/1938 | Evans | 74/605 X |
| 2,489,527 | 11/1949 | Frank | 74/605 |
| 2,631,905 | 3/1953 | Copper | 308/240 |
| 2,926,972 | 3/1960 | Burell | 74/605 X |
| 3,313,016 | 4/1967 | Seulen et al. | 74/605 |
| 3,621,733 | 11/1971 | Seulen et al. | 74/605 |
| 4,311,349 | 1/1982 | Roberts | 308/122 |

FOREIGN PATENT DOCUMENTS 568763 12/1977 U.S.S.R. ................................ 74/605

Primary Examiner—Vinh T. Luong
Attorney, Agent, or Firm—Sughrue, Mion, Zinn, Macpeak & Seas

[57] ABSTRACT

A sliding bearing and a crankshaft used for a crankshaft-connecting rod assembly are disclosed. Particularly, the invention concerns a sliding bearing for a crankshaft-connecting rod assembly, in which journal sections are each provided at each end of at least one crankshaft, one of said journal sections is rotatably supported so that said crankshaft is rotated about said one journal section, a connecting rod has one end rotatably coupled to said other journal section, and a lubricant is supplied form an oil port of each said journal section. The bearing surface of a cylindrical sliding bearing for supporting one of the journal sections with a predetermined clearance or the bearing surface of a cylindrical sliding bearing provided with a predetermined clearance between the other journal section and a connecting rod is formed with a recess, preferably a shallow recess, which corresponds in position to the oil port of each journal section, from which the lubricant is supplied or caused to flow, and extending in the circumferential direction of the sliding bearing. The invention further concerns a crankshaft, in which the outer periphery of at least one of the journal sections of the crankshaft is formed with a recess including the oil port extending in the circumferential direction of the journal section.

4 Claims, 8 Drawing Sheets

SLIDING BEARING AND CRANKSHAFT USED FOR CRANKSHAFT-CONNECTING ROD ASSEMBLY

BACKGROUND OF THE INVENTION

Generally, in internal combustion engines and compressors for automobiles and the like, an assembly consisting of a crankshaft and a connecting rod is used for converting translational reciprocal motion to rotational motion or rotational motion to translational reciprocal motion. In this assembly, the crankshaft is usually rotated in a main journal section in the direction of the arrow in FIG. 1. The main journal section is rotatably supported in a pair of semi-cylindrical sliding bearing halves mounted in a bore of a circular sectional profile assembled in a housing. Further, an end of an adjacent crankshaft is coupled to the journal section, in which one end of a connecting rod is rotatably supported via a pair of semi-cylindrical sliding bearing halves. In the lubricant supply system of this assembly, a main oil supply passages and communicating passages are formed in the housing, and through holes are formed in the individual sliding bearing halves and communicated with communicating passages and the main supply passage. The main journal section of the crankshaft is provided with passages extending in the radial and oblique directions, and the lubricant is supplied through these passages to an oil port in the journal section at the end to be supplied from this oil port to the sliding bearing for lubrication of the connecting rod system.

More specifically, in the assembly consisting of the crankshaft and connecting rod, the lubricant is supplied to the oil supply passage of housing 6 from, for instance, a main oil pump under a predetermined pressure. In the housing, the lubricant from the main oil passage is supplied through the communicating passages to the through holes in the sliding bearing halves and thence to a space between the outer periphery of the crankshaft and inner periphery of each sliding bearing half. The main journal section of the crankshaft is rotatably supported in a state floated by an oil film formed between the outer and inner peripheries. Meanwhile, the lubricant flowing through the space between the crankshaft outer periphery and bearing surface of the sliding bearing is supplied through a radial passage in the journal section and then through an oblique passage to a connecting rod support section. In the connecting rod support section, like the case of the crankshaft, the lubricant is supplied from the oil port to a space between the bearing surface of the sliding bearing mounted on the connecting rod and the outer periphery of the journal section at the end, thus providing predetermined lubricating and cooling effects.

More specifically, in the journal section of the crankshaft and connecting rod (hereinafter referred to as crankshaft or on the like) an oil film formed between the outer periphery of the crankshaft or the like and sliding bearing receives repetitive load on the journal section of the crankshaft or the like and in this way the journal section is rotatably supported. At this time, a continuous and uniform oil film has to be present at all time. This is so because if the oil film is broken or is absent while the journal section of the crankshaft or the like is rotating in the sliding bearing, the outer periphery of the journal section comes into metal contact with the surface of the sliding bearing, thus giving rise to considerate wear or seizure.

Further, recently there has been a trend for an increase of the compressor output and operating load of vehicles. This trend leads to reducing the thickness of the oil film between, the crankshaft or the like and sliding bearing. Accordingly, metal contact has been observed in place, in which no metal contact has heretofore occurred.

Heretofore, improvements in the chemical composition of the bearing metals or alloys forming the bearing surface of the sliding bearing and improvements of the structure of the crankshaft or the like have been proposed from a consideration that such improvements will greatly influence the nature and behavior of the oil film thus formed. Among the former improvements there are those which permit considerable lubrication to be maintained even by interface lubrication which is subject to metal contact. However, the latter structural improvements do not always cope with the recent trend for increasing output and load concerning automobiles.

The structural improvements of the crankshaft or the like can be roughly classified into those which provide an adequate clearance between the bearing surface of the sliding bearing and outer periphery of the crankshaft or the like and those which provide the bearing surface of the sliding bearing with an oil groove, in which the lubricant is temporarily collected before being dispersed over the bearing surface. In the former case, with the provision of the clearance the lubrication property is improved to obtain a cooling effect. However, if the clearance is excessive, the oil film pressure is increased, leading to rupture of the bearing. Therefore, the clearance can not be excessively increased from the standpoint of the bearing life. For this reason, a split bearing has been proposed, which has a cylindrical sliding surface constituted by a crown surface equal to the radius of the crankshaft or the like to be supported and a clearance surface having a radius greater than the radius of the crown surface, as disclosed in U.S. Pat. No. 4,311,34. With this split bearing consisting of a pair of bearing halves, under a high load condition the rotating crankshaft or the like approaches the crown surface of one of the split bearing halves and becomes more distant from the crown surface of the other split bearing half, thus forming a predetermined clearance. The lubricant flows through the clearance to provide lubricating and cooling effects. However, even where such a clearance is provided, under recent high-output, high-load operating conditions the oil film pressure is liable to be reduced greatly in the neighborhood of the oil port of the connecting rod, thus giving rise to metal contact to cause seizure or abnormal wear of the bearing.

Further, where the bearing surface of the sliding bearing is formed with an oil groove, the lubricant supplied is once captured in the oil groove to be distributed over the bearing surface, so that the lubricant dispersion property is greatly enhanced. More specifically, as shown in U.S. Pat. No. 2,631,905, the bearing surface of the sliding bearing is provided with an oil groove, an oil supply groove is communicated with the oil film, and a lubricant supply system is communicated with the oil supply groove. With this sliding bearing, the lubricant supplied form the oil supply system is totally supplied through the oil supply groove to the oil groove, collected temporarily in this oil groove and then dispersed over the bearing surface. However, where such an oil groove is formed on the bearing surface, it is difficult for the oil groove forming portion to support the load. And also, there arises a tendency of a sudden reduction of the oil film thickness, on the oil groove forming portion, where a breakage of the oil film is liable to occur. Particularly, this trend is pronounced under high-output, high-load operating conditions, and it is said that in an assembly consisting of the crankshaft and connecting rod it is generally undesired to provide the bearing surface of the sliding bearing with an oil groove with the sole aim of a lubricant dispersion property.

Further, it has been proposed to provide a shallow groove for the sake of improving the lubricant dispersion property. However, the oil groove is so shallow that it is free from the problems noted above, the aims of dispersion and cooling of the lubricant can hardly be attained.

SUMMARY OF THE INVENTION

According to the invention, there is provided a sliding bearing for a crankshaft-connecting rod assembly, in which journal sections are each provided at each end of at least one crankshaft, one of said journal sections is rotatably supported so that said crankshaft is rotated about said one journal section, a connecting rod has one end rotatably coupled to said other journal section, and a lubricant is supplied from an oil port of each said journal section, a cylindrical sliding bearing being provided in said one journal section with a predetermined clearance provided, a cylindrical sliding bearing provided with predetermined clearance between said other journal section and connecting rod, at least one of said sliding bearings having its bearing surface provided with a recess, preferably a shallow recess corresponding in position to said oil port and extending in the circumferential direction of said sliding bearing.

Thus, each journal section is rotated relative to the housing and connecting rod, the recess of the sliding bearing corresponds to the oil port of each journal section at all times. For this reason, even when the oil film thickness is extremely reduced under high-revolving-rate, high-output operating conditions so that the pressure in and thickness of the oil film are changed cyclically during the rotation, no seizure or like trouble will occur in the portion corresponding to the oil port, and the utmost lubrication can be ensured.

According to the invention, there is also provided a crankshaft for a crankshaft-connecting rod assembly, in which journal sections are each provided at each end of at least one crankshaft, one of said journal sections is rotatably supported so that said crankshaft is rotated about said one journal section, a connecting rod has one end rotatably coupled to said other journal section, and a lubricant is supplied from an oil port of each said journal section, a cylindrical sliding bearing being provided in said one journal section with a predetermined clearance provided, a cylindrical sliding bearing provided with a predetermined clearance between said other journal section and connecting rod, the other periphery of at least one of said journal sections being provided with a recess, preferably a shallow recess corresponding in position to said oil port and extending in the circumferential direction of said journal section.

Thus seizure or like trouble in the portion corresponding to the oil port can be prevented without provision of the recess corresponding to the oil port in the bearing surface of the sliding bearing supporting each journal section.

Further, even if there remain burrs or the like to a certain extent on the journal section in the neighborhood of the oil port, no damage or abnormal wear will occur in each journal section of the crankshaft.

DESCRIPTION OF THE PREFERRED EMBODIMENT

Figure 1:
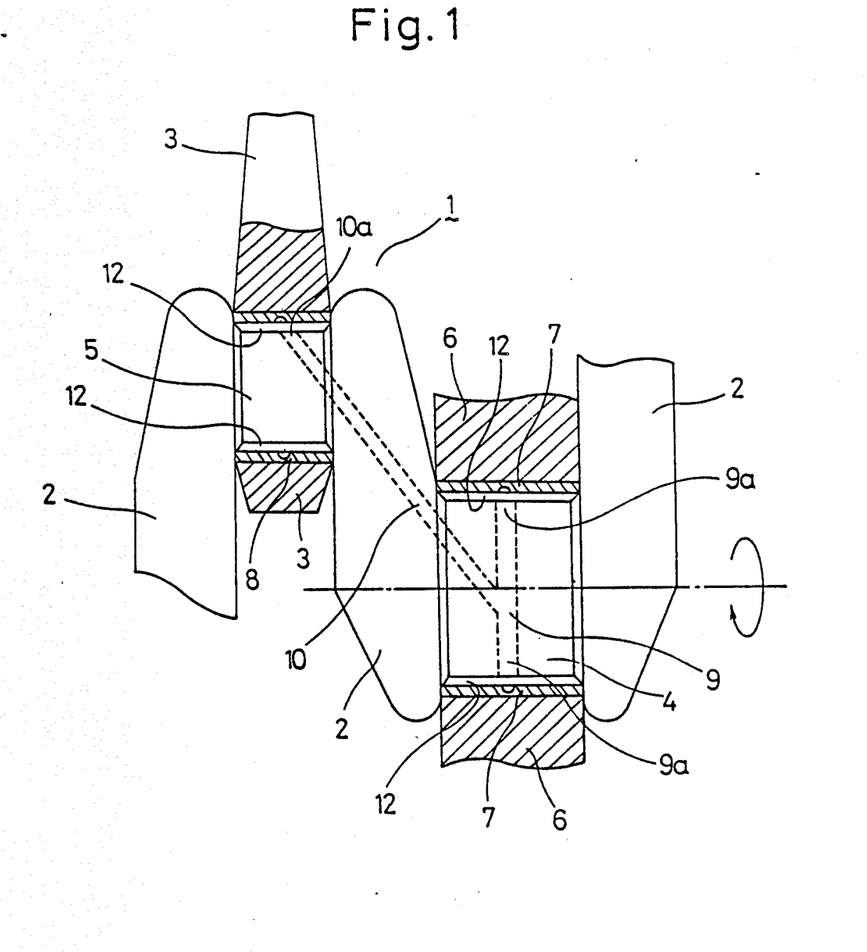
FIG. 1 is a front view, partly in section, showing part of a crankshaft-connecting rod assembly incorporating an embodiment to the sliding bearing and crankshaft according to the invention.

Referring to FIG. 1, reference numeral 1 generally designates an assembly comprising pluralities of crankshafts or crank portions 2 and connecting rods 3. The adjacent crankshafts 2 are coupled to each other by journal sections 4 and 5. In FIG. 1, three crankshafts 2 are shown. Journal sections 4 and 5 are provided at the opposite ends and on the opposite sides of the crankshafts 2 so that the crankshafts 2 are coupled together by these journal sections 4 and 5. In this way, the plurality of crankshafts 2 are made integral. Either journal section 4 or 5, for instance the journal section 4, is rotatably supported in a housing 6 for rotation in the direction of the arrow in FIG. 1. The rotational force is transmitted to, for instance, a rotational drive system of an automobile (not shown). The connecting rod 3 is rotatably assembled in the other journal section 5. The connecting rod 3 is coupled to a piston-cylinder mechanism (not shown). Reciprocal motion is transmitted from the piston-cylinder mechanism to the connecting rod 3 to cause rotation of each crankshaft 2 about the axis of the main journal section 4 in the direction of the arrow. The rotational motion is taken out as reciprocal motion of the piston-cylinder assembly.

In the assembly 1 having the above construction, the journal sections 4 and 5 are rotatably supported via intervening sliding bearings 7 and 8. More specifically, the main journal section 4 is surrounded by the main sliding bearing 7. The main sliding bearing 7 is usually secured to the housing 6, and the main journal is rotatably supported in the main sliding bearing 7.

Figure 2:
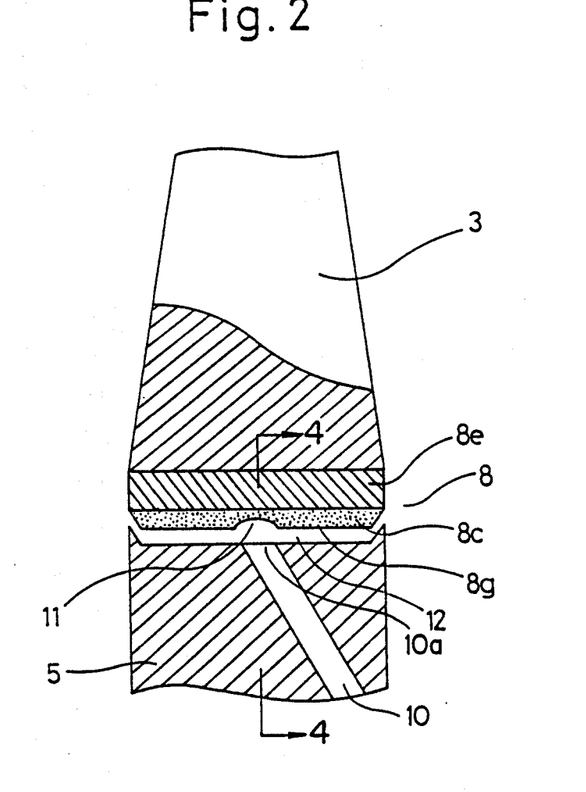
FIG. 2 is a front view, partly in section and with an enlarged-scale portion of FIG. 1, showing a sliding bearing in an embodiment of the invention provided in a portion of the crankshaft-connecting rod assembly shown in FIG. 1, in which the connecting rod is assembled.
Figure 4:
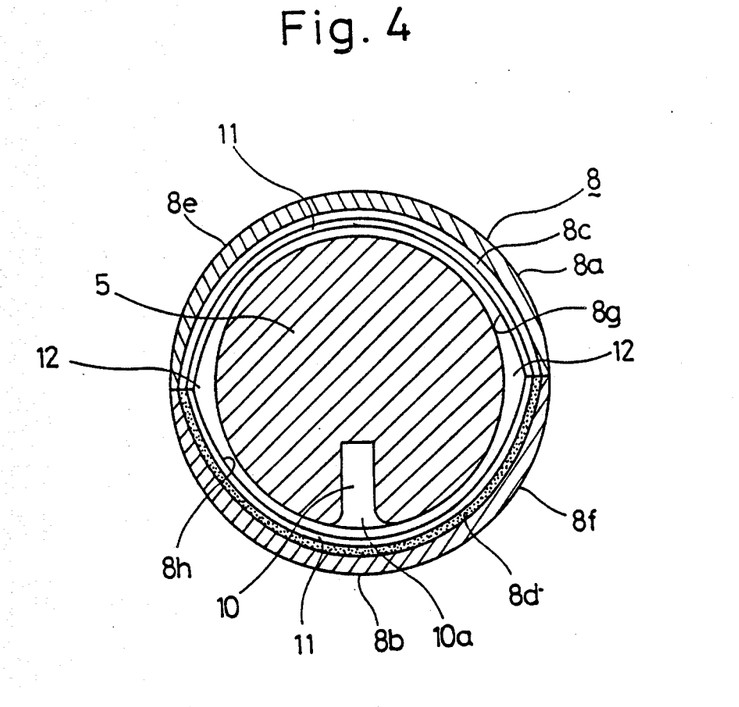
FIG. 4 is a sectional view taken along arrow line 4—4 in FIG. 2.

The other sliding bearing 8 is assembled in a bore having a circular sectional profile, formed at one end of the connecting rod 3, as shown in FIG. 2. The connecting rod is rotatably supported in the other journal section 5 via the other sliding bearing 8. The other sliding bearing 8, as shown in FIG. 4, usually consists of a pair of split bearing halves 8a and 8b. The split bearing halves 8a and 8b are assembled together with their end surfaces in contact with one another into a ring-like form such that their inner peripheries serve as bearing surfaces 8g and 8h to rotatably support the other journal section 5. The main sliding bearing 7 likewise consists of a pair of split bearing halves. Further, in any of the split bearings, as typically shown by the pair of split bearing halves 8a and 8b, the bearing surfaces 8g and 8h for supporting the journal section 5 are constituted by bearing alloy layers 8c and 8d which are integral with respective back metal supports 8e and 8f. Recently, the bearing allow layers 8c and 8d have been made of aluminum or an alloy thereof for the purposes of weight reduction and output increase, but they may be made of copper or an alloy thereof or different metals or alloys thereof as well.

As shown in FIGS. 1, 2 and 4, a clearance 12 of 1/100 to 1/2000 of the diameter of each journal section is provided between the sliding bearings 7 and 8 and journal sections 4 and 5, and lubricant is supplied to this clearance as will described later. When the lubricant is supplied in this way, the journal sections 4 and 5 are supported by the resultant lubricant film, thus maintaining a desired lubrication property and providing a predetermined cooling effect. The clearance 12 may be made constant over the entire circumference. However, it is possible to make the opposite ends of the split bearing halves 8a and 8b thinner to increase corresponding portions of the clearance 12 so as to alleviate wear and damage by a so-called oil relief.

Further, the lubricant is supplied from a lubricant supply system (not shown). Usually, the journal section 5 is lubricated by the lubricant supplied to the main journal section 4. However, it is possible to supply the lubricant independently to the two journal sections. For example, as shown in FIG. 1, the lubricant is supplied from the lubricant supply system to the main supply passage (not shown) provided in the housing 6 or communicating passages (not shown), while the communicating passages are communicated at their end with through holes (not shown) in the main sliding bearing 7, and the lubricant is supplied through these through holes to the space between the sliding bearing 7 and main journal section 4. Since there is a predetermined clearance between the sliding bearing 7 and main journal section 4 as noted above, the main journal section 4 is rotated on the main sliding bearing 7, and the lubrication is maintained by the flow of the lubricant. The lubricant supplied to the space between the main sliding bearing 7 and main journal section 4 is supplied to the space between the other journal section 5 and other sliding bearing 8 assembled to the connecting rod 3. More specifically, as shown in FIG. 1, communicating passages 9 and 10 are provided such that they extent in the radial direction of the main journal section 4 and an oblique direction with respect to the main journal section 4, crankshaft 2 and other journal section 5, and the lubricant is caused to flow form the oil port 9a corresponding to the inlet of the communicating passage 9 to be supplied from the oil port 10a corresponding to the outlet of the communicating passage 10 to the space between the other journal section 5 and other sliding bearing 8.

Figure 3:
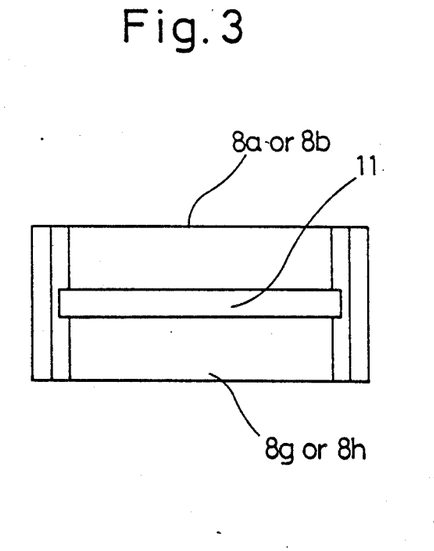
FIG. 3 is a plan view showing one of pair split bearing halves constituting the sliding bearing in the embodiment of the invention shown in FIG. 2.

While the assembly 1 has the construction as described above, according to the invention in the other sliding bearing 8, to which at least the connecting-rod 3 is assembled, the bearing surfaces 8g and 8h of the split bearing halves 8a and 8b are each formed with a recess 11 in correspondence to the oil port 10a in the other journal section 5. The recess 11, as shown in FIGS. 2, 3 and 4, extends in the circumferential direction of the other sliding bearing 8, i.e., pair split bearing halves 8a and 8b so that it faces the oil port 10a at all times when the connecting rod 3 is rotated relative to the other journal section 5. With the recess 11 formed in correspondence to the oil port 10a in this way, the lubrication can be maintained with the clearance 12 provided in the above way. In addition, since the recess 11 is presently locally in correspondence to the oil port 10a, seizure or like trouble will never take place in portions corresponding to the oil port 10a even if the lubricant film in the clearance 12 is reduced extremely due to an output increase, and the lubrication can be ensured to the utmost.

It is said that the most significant cause of the seizure and damage taking place in the sliding bearing 7 or 8 is the occurrence of metal contact as a result of strong contact between the shaft of the journal section 4 or 5 and sliding bearing 7 or 8 supporting the shaft. Such strong contact is said to take place more frequently and strongly in the edges of the split bearing halves rather than the central portion thereof for it is difficult to ensure the flexing of the shaft of the journal section and sufficient oil film thickness at the ends of the split bearing halves. For this reason, the end portions of the split bearing half is made thinner by several 10μm compared to the central portion as shown in FIG. 4 so that flow of the lubricant at a rate above a constant level can be ensured even if the two split bearing halves 8a and 8b are assembled together with a slight deviation between the end surfaces, thus forming so-called oil reliefs.

However, even if oil reliefs are provided at the ends of the pair of split bearing halves, under high-revolving-rate, high-output operating conditions as in recent automotive internal combustion engines, seizure and wear will occur in other portions of the split bearing halves than the ends, e.g., central portion, because the lubricant in the clearance 12 is extremely strongly compressed.

Accordingly, the inventors have made a detailed study about the seizure and wear taking place in the central portion of the split bearing under high-revolving-rate, high-output conditions to reveal the following.

First, the seizure under high-revolving-rate, high-output conditions occur substantially annularly in the central portion of the split bearing halves and at a position, which always corresponds to the oil port of the journal section. In contrast, in the ends of each split bearing half, which are thinner by about several 10μm than the central portion, no seizure or wear is recognized. From these facts, it has been found that the seizure under high-revolving-rate, high-output conditions, unlike the heretofore observed seizure, is deeply related to the oil port of the shaft of the journal section or the like and is greatly influenced by variations of the thickness of the oil film between the pair of sliding bearing halves and journal section, relative positions of the journal section and sliding bearing and oil film pressure.

Figure 6:
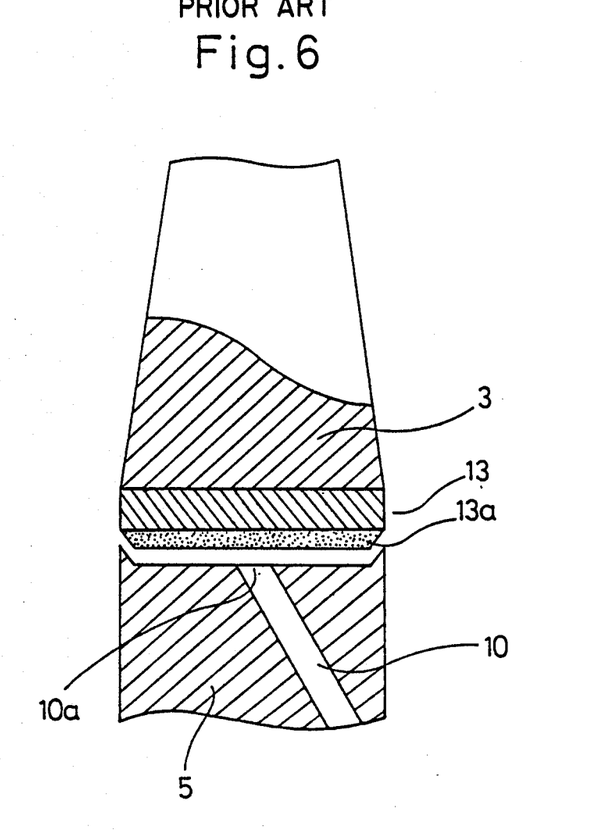
FIG. 6 is a view similar to FIG. 2 but showing a prior art sliding bearing provided in a portion of the crankshaft-connecting rod assembly shown in FIG. 1, in which the connecting rod is assembled.

More specifically, under high-revolving-rate, high-output conditions a considerably high oil film pressure of 2000 to 3000 kgf/cm$^2$ acts on the prior art sliding bearing 13 as shown in FIG. 6. When such a high pressure is applied, the bearing alloy layer 13a consisting of an aluminum alloy is compressed from its surface by a thickness of about 1 μm. In contrast, in portions corresponding to the oil port 10a of the other journal section 5 or the like the oil film pressure is reduced to be less than 10 kgf/cm$^2$.

Figure 7:
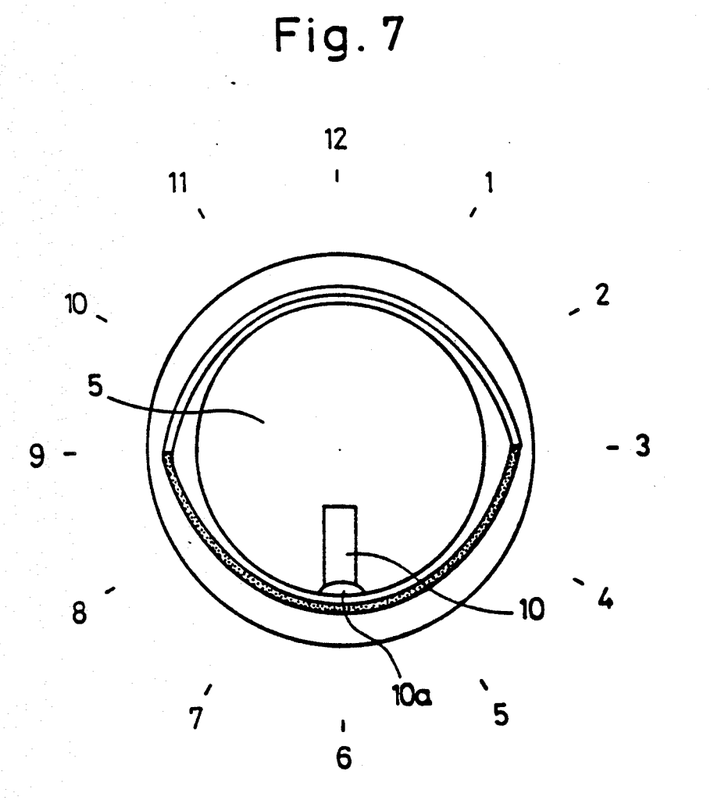
FIG. 7 is a sectional view for generally explaining the relation between each journal section of the crankshaft and sliding bearing supporting the journal section.
Figure 8:
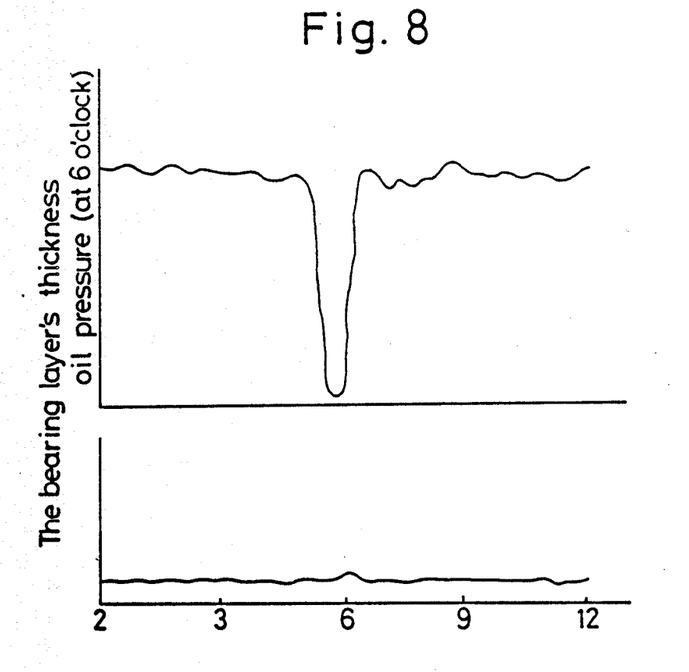
FIG. 8 is a graph showing the relation among the position of each journal section during rotation, oil film pressure and displacement of the bearing layer of the sliding bearing.
Figure 9:
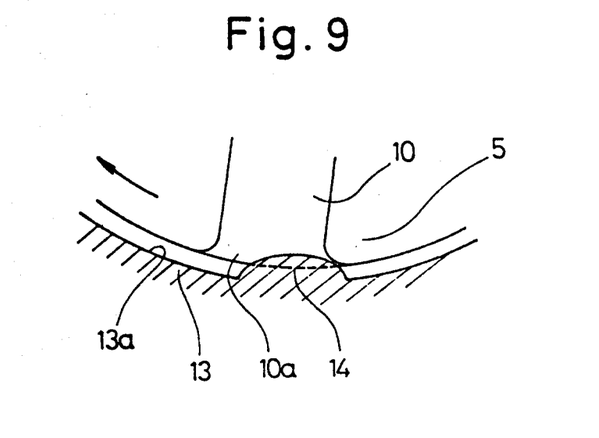
FIG. 9 is a view for explaining metal contact taking place near an oil port of each journal.

A further detailed description will be described in detail with reference to FIGS. 7 and 8. FIG. 7 is a sectional view similar to FIG. 4. FIG. 8 is a graph showing the relation between the oil film pressure and bearing alloy layer thickness when the other journal section 5 is rotated in the clockwise direction. Referring to FIG. 7, the oil port is provided at a position corresponding to 6 o'clock. Namely, in case that a clockwise rotation of the other journal section 5 is between 12 o'clock and 6 o'clock and also between 6 o'clock and 12 o'clock, higher oil film pressure is supported by between the bearing alloy layer and the other journal section 5 and as a result, continuous compression is liable to applied to the bearing layer. During these intervals, the oil film pressure is as high as 3000 kgf/cm$^2$ as shown in FIG. 8. On the contrary, an existence of an oil port, i.e., oil outlet makes an instantaneous reduction to about 10 kgf/cm$^2$ of oil film pressure at a portion of corresponding to 6 o'clock. In the cyclic changes in the oil film pressure, when the position of 6 o'clock corresponding to the oil port is reached, the pressure is released from the surface of the bearing alloy layer having been compressed, so that the layer swells as shown in FIG. 8. When the layer swells even by about 1 μm, the oil film thickness is below 1 μm under high-revolving-rate, high-output conditions. The surface has a roughness of about 1 μm even if it has been finished with high accuracy. For this reason, when the shaft of the journal section reaches the position of 6 o'clock, the shaft and bearing surface of the sliding bearing are in metal contact. This phenomenon is generated at the position corresponding to the oil port. Further, as shown in FIG. 8, the displacement of the bearing alloy layer surface takes place after a slight delay time from the instant of change in the oil film pressure. This swelling portion 14, as shown in FIG. 9, is brought into strong contact with a portion e.g., the latter half, of the wall of the oil port 10a of the journal section 5. If this continuous phenomenon is repeated, the temperature in the neighborhood of the oil port 10a is raised, and the corresponding oil film portion becomes even thinner. On the other hand, the oil film pressure is increased, and the metal contact force becomes further increased. If the journal section 5 is provided with a plurality of oil ports, this phenomenon takes place two or more times during one rotation of the journal section 5. Further, in the individual split bearing halves constituting the sliding bearing, at the ends, at which the bearing alloy layer is thinner as noted before, the oil film pressure is reduced, and the surface of the bearing alloy layer is changed to a certain extent with a pressure change. Even with this change, metal contact hardly takes place at the ends of the split bearing halves.

The inventors, with the knowledge of the phenomenon of seizure under high revolving-rate and high-output operating conditions, have noted that if a portion of each split bearing half except for the ends, in which the bearing alloy surface is changed repeatedly with oil film pressure changes, is formed with a recess with such a depth sufficient to avoid contact with the shaft of the journal section or the like, no seizure will occur even under high-revolving-rate, high-output operating conditions.

Thus, where the other journal section 5 is supported in the pair split bearing halves 8a and 8b assembled on the connecting rod 3, as shown in FIGS. 2 and 3, the recess 11 extends along the bearing surfaces 8g and 8h of the split bearing halves 8a and 8b in the circumferential direction in correspondence to the oil port 10a. The width of the recess 11 should be at least equal to the width of the oil port 10a of the opposed other journal section 5.

If the recess 11 has an excessive width, the clearance is excessively increased in the recess 11. Therefore, an oil film having a desired thickness can not be formed which in turn causes troubles in the rotation of the journal section. For this reason, the upper limit of the width of the recess 11 is adequately greater than the diameter of the oil hole 10a by 30%.

Further, the depth of the recess 11 should be determined in relation to the surface state of the sliding bearing, e.g., bearing surfaces 8a and 8b of the split bearing halves 8a and 8b and opposed other journal section 5. More specifically, it should be at least the sum of the maximum coarsenesses of the surfaces of the opposed other journal section 5 and each of the split bearing halves 8a and 8b, e.g., 1 μm. If the depth is excessive, it is difficult to support the load in that portion, while in the other portion the desired oil film can be difficult to form, thus giving rise the possibility of bearing fatigue. For this reason, the depth should be less than 20 μm.

Further, in addition to providing the recess 11 in the outer sliding bearing, i.e., each of the split bearing halves 8a and 8b, assembled on the connecting rod 3, a recess (not shown) may be provided in the main sliding bearing 7 supporting the main journal section 4 of the crankshaft 2, i.e., in the bearing surface of each split bearing half, in correspondence to the oil port 9a corresponding to the inlet of the radial communication passage 9. This recess likewise extends along the bearing surface of each split bearing half in the circumferential direction.

Figure 5:
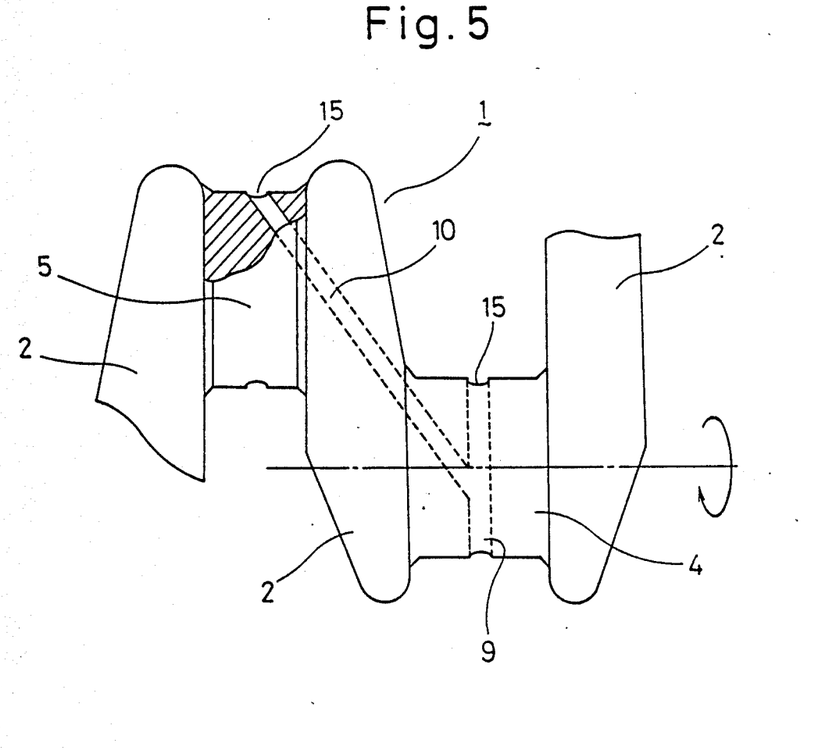
FIG. 5 is a front view, partly in section, showing a crankshaft in an embodiment of the invention.

In the assembly 1, each of the journal sections 4 and 5 may be provided with a recess 15 as shown in FIG. 5. The recess 15 is formed annularly with inclusion of the oil port 9a corresponding to the inlet of the communication passageway 9 and the oil port 10a corresponding to the outlet of the communication passage 10. Where a recess is formed in each of the journal sections 4 and 5 in this way, metal contact does not take place even with a considerably small oil film thickness under high-output operating conditions to ensure sufficient lubrication even without provision of any recess in the sliding bearing supporting each of the journal sections 4 and 5.

In other words, even when the bearing alloy layer of the sliding bearing is caused to swell in the neighborhood of the oil ports 9a and 10a with cyclic changes in the oil film pressure, no metal contact will take place between the bearing alloy layer and journal surface for each of the journal sections 4 and 5 is formed with the annular recess 15 including the oil ports 9a and 10a. Further, even when the machining accuracy is increased considerable when forming the oil ports 9a and 10a in the journal sections 4 and 5, burrs or the like to cause scars and scratches on the surface of the opposed other journal section, thus causing abnormal wear. Particularly, under high-revolving-rate, high-output operating conditions this phenomenon becomes outstanding, giving rise to seizure.

However, the damage to the bearing or the like, as noted above, can be avoided because of the provision of the annular recess 15 including the oil port of each journal section, particularly the main journal section 5.

EXAMPLE 1

In a crankshaft-connecting rod assembly for a straight type gasoline engine including a four-cylinder four-cycle gasoline engine with a displacement of 1.8 l, connecting rods were each assembled via a sliding bearing according to the invention to each journal sections No. 1 and No. 3 among the four journal sections (with a diameter of 45 mm and with oil ports with a diameter of 7 mm). Also, connecting rods were assembled via prior art bearings to the journal sections No. 2 and No. 4.

Each of these two different kinds of sliding bearings was obtained by cylindrically assembling semicylindrical split bearing halves with an inner diameter of 45 mm, a width of 12.9 mm and a thickness of 1.5 mm. The bearing alloy layer of each split bearing half was made of an aluminum alloy, and its surface was finished to a coarseness of approximately 2.0 μm without provision of any overlay plating layer of these sliding bearings, those according to the invention were each formed with an annular recess (with a width of 8 m and a depth of 7 μm) formed by boring such that it corresponds to the oil port of the journal section except for the relief portions at the opposite ends. In contrast, in the prior art sliding bearings the bearing surface was made flat without provision of any such recess.

The gasoline engine with the sliding bearings according to the invention and prior art sliding bearings according to the invention and prior art sliding bearings assembled alternately was tested under conditions shown in Table 1 for evaluating the seizure-resistant property, and the results were as shown in Table 2.

TABLE 1

| | Test conditions | |
|---|---|---|
| Engine | | Straight type gasoline engine including four-cylinder, four-cycle, Gasoline (with turbocharger) Displacement: 1.8 l |
| Journal section | Diameter: | φ45 mm |
| | Material: | S 45 C |
| | Hardness: | Hrc 55 |
| | Surface roughness (R max): | 0.8 μm |
| | Oil port type: | Through hole type |
| | Oil port diameter: | 7 mm |
| Test conditions | Revoloving rate: | 6,300 rpm |
| | Load: | Full-load |
| | Oil: | SAE 7.5 w-30 |
| | Supply oil temperature: | 120° C. |
| Supply oil pressure: | 4.0 kgf/cm² | |
| | Test time: | 50 Hrs |

TABLE 2

| Seizure-Resistant property | |
|---|---|
| | Bearing status after 50 hours of test. |
| Sliding bearing according to the invention: | No abnormal appearance |
| Prior art sliding bearing: | Central annular seizure (coagulation wear with a depth of 5 μm) |

EXAMPLE 2

In the crankshaft-connecting rod assembly for the straight type gasoline engine including four cylinder gasoline engine with a displacement of 1.8 l shown in Example 1, the main journal section (with a diameter of 45 mm) was formed with a recess inclusive of oil ports (with a diameter of 7 mm) and having a width of 7 mm and a depth of 5 μm. Then, the test was conducted under test conditions shown in Table 1 of Example 1 to evaluate the seizure-resistant property. During 20 hours of test operation, seizure was generated at the central portion of the bearing surface of the prior art assembly, said central portion corresponding to the oil port forming area of main journal section. On the contrary, no seizure was generated at any portion of the bearing surface of this invention assembly, during 20 hours test operation.

What is claimed is:

1. A sliding bearing for a crankshaft-connecting rod assembly (1), said assembly including at least one crank portion (2) having a main journal section (4) provided at one end thereof and a connecting rod journal section (5) provided on an opposite end of said crank portion, said main journal section and said connecting rod journal section each having a lubricant port opening at the surface for supplying lubricant thereto, said sliding bearing being provided to rotatably support one of said main journal section and said connecting rod journal section, said sliding bearing comprising:

(a) a pair of split bearing halves having opposite ends which are thinner in radial thickness than a remainder of each bearing half to thereby form a predetermined clearance (12) between said sliding bearing and one of said main journal section and said connecting rod journal section;

(b) a shallow recess (11) formed in an inner bearing surface of each split bearing half and axially aligned in a position opposed to said lubricant port, said recess extending in a circumferential direction of said inner bearing surface.

2. The sliding bearing according to claim 1, wherein said recess has a width equal to 1 to 1.3 times the diameter of a corresponding said lubricant port and has a maximum depth greater than the sum of the maximum surface roughness of the surface of one of said main journal section and said connecting rod journal section and the inner bearing surface of said sliding bearing and smaller than 20μm.

3. A crankshaft-connecting rod assembly (1) rotatably supported in a housing (6), said assembly comprising:

(a) at least one crank portion (2) having a main journal section (4) provided at one end thereof and a connecting rod journal section (5) provided on an opposite end of said crank portion;

(b) a lubricant port (9a, 10a) opening at the surface of each of said main journal and said connecting rod journal sections for supplying lubricant thereto, each said lubricant port communicating with a corresponding passage (9,10) formed in said main journal section and said connecting rod journal section, respectively;

(c) a first cylindrical sliding bearing (7) secured to said housing (6) for rotatably supporting said main journal section in an inner bearing surface thereof, a predetermined clearance (12) being provided between said first sliding bearing and said main journal section; and (d) a second cylindrical sliding bearing (8) secured to a connecting rod (3) and being rotatably coupled at an inner bearing surface to said connecting rod journal section (5), a predetermined clearance (12) being provided between said second sliding bearing and said connecting rod journal section, (e) wherein at least one of said first and second sliding bearings has a shallow recess (11) formed in said inner bearing surface and axially aligned so as to communicate with a corresponding said lubricant port, said recess extending in a circumferential direction around an entire periphery of said inner bearing surface;

(f) further wherein each of said first and second sliding bearings includes a pair of split bearing halves, said split bearing halves having opposite ends which are thinner in radial thickness to form said predetermined clearance.

4. A crankshaft-connecting rod assembly according to claim 3, wherein said recess has a width equal to 1 to 1.3 times the diameter of a corresponding said lubricant port, and has a maximum depth greater than the sum of the maximum surface roughness of the surfaces of said main and connecting rod journal sections and the inner bearing surfaces of said first and second sliding bearings and smaller than 20$\mu$m.

* * * * *